(12) United States Patent
Bazzinotti et al.

(10) Patent No.: US 7,266,715 B1
(45) Date of Patent: Sep. 4, 2007

(54) METHODS AND APPARATUS FOR MAINTAINING A VIRTUAL PRIVATE NETWORK CONNECTION

(75) Inventors: John Bazzinotti, Norwood, MA (US);
Peter Scott Davis, Wakefield, MA (US); Timothy Steven Champagne, Attleborough, MA (US); Kenneth John Wante, Bellingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 635 days.

(21) Appl. No.: 10/425,787

(22) Filed: Apr. 29, 2003

(51) Int. Cl.
*G06F 11/00* (2006.01)
(52) U.S. Cl. ............................... 714/4; 714/47
(58) Field of Classification Search ................. 370/220
See application file for complete search history.

(56) References Cited

U.S. PATENT DOCUMENTS

| | | | |
|---|---|---|---|
| 5,875,290 A * | 2/1999 | Bartfai et al. .................. 714/13 |
| 6,006,259 A | 12/1999 | Adelman et al. ............ 709/223 |
| 6,078,957 A | 6/2000 | Adelman et al. ............ 709/224 |
| 6,108,300 A * | 8/2000 | Coile et al. .................... 714/4 |
| 6,185,695 B1 * | 2/2001 | Murphy et al. ................. 714/4 |
| 6,477,663 B1 * | 11/2002 | Laranjeira et al. ............. 714/11 |
| 6,704,282 B1 | 3/2004 | Sun et al. .................... 370/237 |
| 6,775,235 B2 | 8/2004 | Datta et al. .................. 370/238 |
| 6,782,422 B1 * | 8/2004 | Bahl et al. .................... 709/224 |
| 7,000,016 B1 * | 2/2006 | Vanderbeck et al. ........ 709/226 |
| 7,000,121 B2 * | 2/2006 | Jarosz ......................... 713/151 |
| 2001/0056503 A1 * | 12/2001 | Hibbard ....................... 709/250 |
| 2003/0088698 A1 * | 5/2003 | Singh et al. ................. 709/239 |

FOREIGN PATENT DOCUMENTS

JP            409259096 A   * 10/1997

* cited by examiner

*Primary Examiner*—Gabriel L. Chu
(74) *Attorney, Agent, or Firm*—Chapin IP Law, LLC; Barry W. Chapin, Esq.

(57) ABSTRACT

A client device establishes a virtual private network connection with a central site or network through a master concentrator. The master concentrator transmits state information, relating to the virtual private network connection, to a backup concentrator. In the event the master concentrator fails during a communications session between the client device and the network, the backup concentrator maintains the communication session between the client device and the network over the virtual private network connection using the connection state information received from the master concentrator. Such a configuration allows for failover of a virtual private network connection from the master concentrator to the backup concentrator without requiring the client device to re-establish the virtual private network connection with the central site or network. The configuration also allows the client device to maintain an existing communications session with the network.

27 Claims, 6 Drawing Sheets

METHODS AND APPARATUS FOR MAINTAINING A VIRTUAL PRIVATE NETWORK CONNECTION

BACKGROUND OF THE INVENTION

A computer network, such as the Internet, allows users to transmit data to, and receive data from, one or more sites or servers associated with the network.

Remote access provides a client (e.g., computerized) device the ability to log onto or access a computer network from a "remote" location. The term "remote" does not refer to physical distance, but rather to a location that is not part of a configured network. One conventional form of remote access involves the use of a virtual private network (VPN). The VPN is a type of private network constructed using a public network infrastructure (e.g., the Internet) to connect divergent network nodes (e.g., remote sites or users). Instead of using a dedicated, physical connection, such as a leased line, a VPN uses "virtual" connections routed from, for example, a company's private central network through a public network (e.g., the Internet) to a remote site or to a remote employee on the road or working from home. Such "virtual" connections are formed in a process known as tunneling. VPN's are conventionally constructed to operate over a public network through the use of a combination of data encapsulation, data encryption, and user authentication.

In a conventional private network, one or more concentrators provide remote clients with multiple points of access to a central site (e.g., server) or network. A concentrator is a type of multiplexor that combines multiple channels onto a single transmission medium such that all of the individual channels can be simultaneously active. Conventionally, each concentrator within the private network has a unique IP address. A client device establishes a VPN connection with a central site or network through a single concentrator using the IP address of a particular concentrator.

SUMMARY OF THE INVENTION

Conventional devices and methods of accessing remote networks suffer from a variety of deficiencies.

As described, when establishing a VPN connection with a central site or network, the client accesses the network through a single concentrator using the IP address of that concentrator. The concentrator typically maintains state (e.g., current status) information relating to the VPN connection between the VPN client and the central site, thereby providing for the existence of the VPN connection between the client device and the network for the duration of a data transmission or communication session. In the case where the concentrator fails (e.g., becomes inoperative), the concentrator breaks the VPN connection between the client device and the central site and loses the state information related to the VPN connection. The client device, in such a case, must establish and authenticate another VPN connection to the central site through another concentrator. Such establishment and authentication is time consuming to the end user of the client device. In the case where the client device is an unattended client device, such as a client device in an after-hours retail environment, a relatively large amount of time can pass between failure of a VPN connection caused by failure of a concentrator and establishment and authentication of another VPN connection to the central site. In such a case, failure of the VPN connection for a relatively long time period can cost the retailer a monetary loss caused by the loss in productivity of the client device.

By contrast, embodiments of the present invention significantly overcome such deficiencies and provide mechanisms for maintaining a virtual private network connection between a client device and a network in the event of a failure of a concentrator carrying the VPN connection. A client device establishes a virtual private network connection with a central site or network through a master concentrator. The master concentrator transmits state information, relating to the virtual private network connection, to a backup concentrator. In the event the master concentrator fails during a communications session between the client device and the network, the backup concentrator maintains the communication session between the client device and the network over the virtual private network connection using the connection state information received from the master concentrator. Such a configuration allows for failover of a virtual private network connection from the master concentrator to the backup concentrator without requiring the client device to re-establish the virtual private network connection with the central site or network. The configuration also allows the client device to maintain an existing communications session with the network.

One embodiment of the invention relates to a method for maintaining a virtual private network connection between a client device and a network in a master concentrator. In such an embodiment, the master concentrator establishes the virtual private network connection between the client device and the network for a communication session between the client device and the network where the virtual private network connection having associated connection state information. The master concentrator transmits the connection state information to a backup concentrator. The master concentrator experiences a failure event during the communication session and in response to experiencing the failure event, causes the backup concentrator to maintain the communication session with the network over the virtual private network connection through the backup concentrator using the connection state information received by the backup concentrator. The master concentrator, therefore, allows for failover of the virtual private network connection without requiring the client device to re-establish or re-authenticate the existing virtual private network connection. Such failover also allows communication session, such as active sessions having session-oriented applications (e.g., File Transfer Protocol sessions), to continue without adversely impacting the client device by causing a break in the communication session.

In one arrangement, the master concentrator selects the backup concentrator from a plurality of concentrators. Such selection is based upon a criteria (e.g., selection criteria) of the concentrators including the concentrator load, concentrator location, or concentrator performance (e.g., the relative load, location, or performance of a particular concentrator, relative to the other concentrators within the plurality of concentrators).

In one arrangement, the master concentrator updates the state information of the virtual private network connection prior to experiencing the failure event. Virtual private network connections typically utilize state information, such as encryption keys, negotiated between the client device and the network to decrypt information transmitted over the VPN connection. Conventionally, the client device and the concentrator renegotiate the encryption keys on a periodic basis to limit an unauthorized user from decrypting the keys and, thereby, gain access to the VPN connection. By updating the state information, the master concentrator stores the most recent or updated state information associated with the VPN connection. The master concentrator transmits the updated state information to the backup concentrator. In the event the master concentrator fails, because the backup concentrator stores the updated state information, the backup concentrator can maintain the VPN connection with the client device.

In one arrangement, the master concentrator transmits network identification information (e.g., Internet Protocol address), associated with the master concentrator, to the backup concentrator. The master concentrator then causes the backup concentrator to transmit a redirect message to the client device where the redirect message appears, to the client device, to have the network identification information associated with the master concentrator. The redirect message, such as an Internet Key Exchange notify message, furthermore, directs the client to maintain the virtual private network connection with the backup concentrator. By spoofing the network identification information of the master concentrator, the backup concentrator causes the client device to maintain the communications session with the network when the master concentrator experiences a failure event.

Other embodiments of the invention include a master concentrator having at least one communications interface, a controller, and an interconnection mechanism coupling the at least one communications interface and the controller. The controller is configured to establish the virtual private network connection between the client device and the network for a communication session between the client device and the network where the virtual private network connection has associated connection state information. The controller transmits the connection state information to a backup concentrator and, in response to experiencing the failure event during the communications session, causes the backup concentrator to maintain the communication session with the network over the virtual private network connection through the backup concentrator using the connection state information received by the backup concentrator.

Another embodiment of the invention relates to a method for maintaining a virtual private network connection between a client device and a network in a backup concentrator. In such an embodiment, in response to a master concentrator establishing the virtual private network connection between the client device and the network for a communication session between the client device and the network, the virtual private network connection having associated connection state information, the backup concentrator receives the connection state information from the master concentrator and monitors the master concentrator for a failure event during the communication session. In response to detecting the failure event, the backup concentrator maintain the communication session with the network over the virtual private network connection through the backup concentrator using the connection state information received from the master concentrator. Such a configuration allows for failover of a virtual private network connection from a master concentrator to a backup concentrator without requiring the client device to re-establish the virtual private network connection with the central site or network.

Another embodiment of the invention relates to a method for maintaining a virtual private network connection between a client device and a network in a client device. In such an embodiment, the client device establishes the virtual private network connection with a network, through a master concentrator, for a communication session between the client device and the network, the virtual private network connection having associated connection state information. The client device receives a redirect message from a backup concentrator through the virtual private network connection. In response to receiving the redirect message, the client device maintains the communication session with the network over the virtual private network connection and through the backup concentrator using the connection state information, received by the backup concentrator from the master concentrator. Such a configuration allows the client device to maintain the virtual private network connection with the network during failover of the master concentrator to a backup concentrator (e.g., during failover, the client is not required to re-establish the virtual private network connection with the network).

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a failover application that when performed on the processor, produces a failover process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a failover manager that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Embodiments of the present invention provide mechanisms for maintaining a virtual private network connection between a client device and a network in the event of failure of a concentrator carrying the virtual private network connection. A client device establishes a virtual private network connection with a central site or network through a master concentrator. The master concentrator transmits state information, relating to the virtual private network connection, to a backup concentrator. In the event the master concentrator fails during a communications session between the client device and the network, the backup concentrator maintains the communication session between the client device and the network over the virtual private network connection using the connection state information received from the master concentrator. Such a configuration allows for failover of a virtual private network connection from the master concentrator to the backup concentrator without requiring the client device to re-establish the virtual private network connection with the central site or network. The configuration also allows the client device to maintain an existing communications session with the network.

Figure 1:
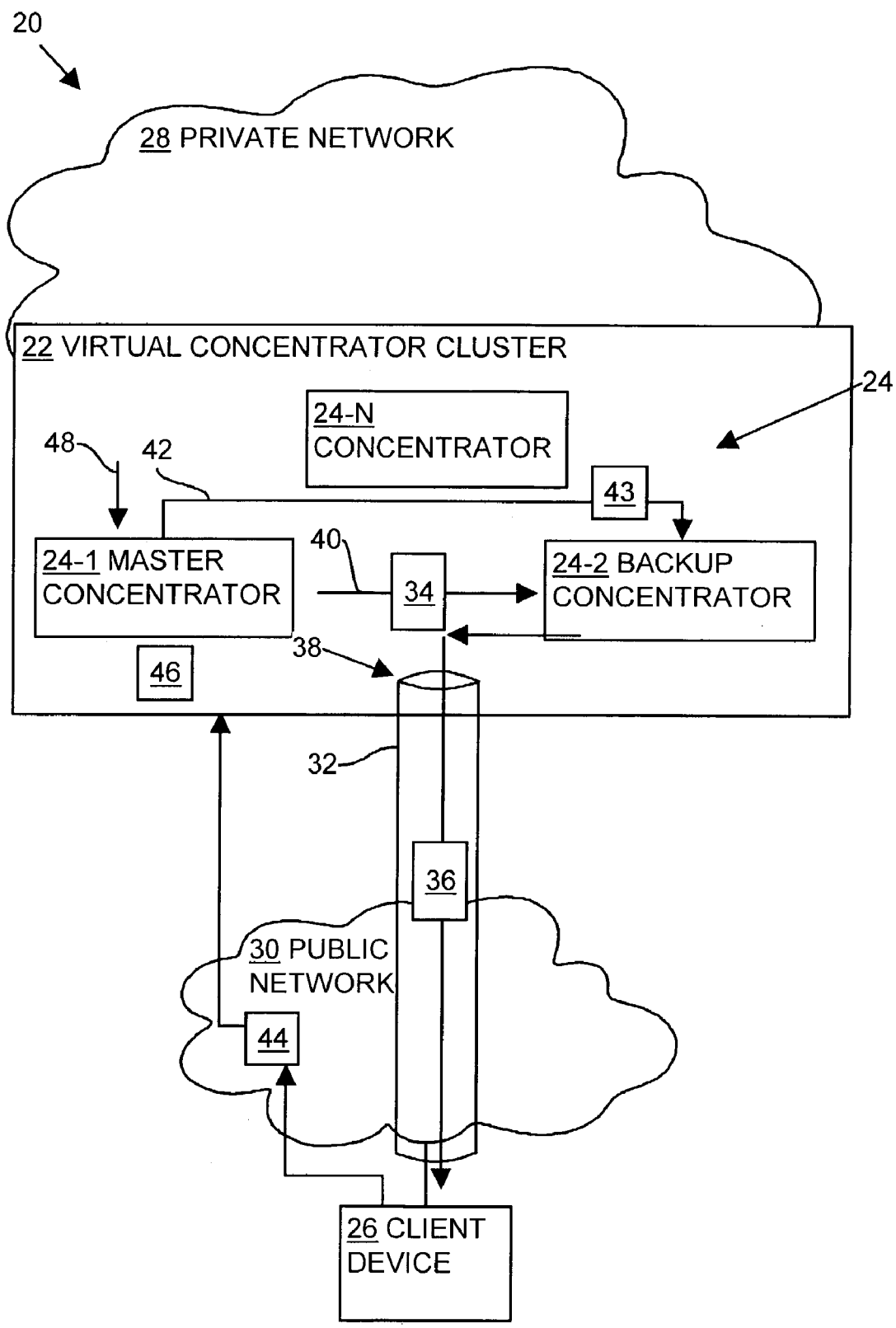
FIG. 1 is a block diagram of a data communication system, configured according to one embodiment of the invention.

FIG. 1 illustrates a data communications system 20, according to one arrangement. The data communications system 20 includes a private network 28 having a virtual concentrator cluster 22, a public network 30, a client device 26, and a tunnel or virtual private network (VPN) connection 32 formed, through the public network 30, between the client device 26 and the private network 28.

The private network 28, in one arrangement, is a Local Area Network (LAN), such as a corporate network. The private network 28 includes corporate resources, such as computer servers and printers, accessible by client devices 26 that log into the network 28.

The virtual concentrator cluster 22 interfaces the private network 28 with the client device 26. The virtual concentrator cluster 22 has multiple network interface devices, such as gateways or concentrators 24-1, 24-2, 24-N, that work together as a single entity. The virtual concentrator cluster 22 has a single network identification or Internet Protocol (IP) address 46, identifiable by a client device 26. The network identification address 46 is not tied to a specific concentrator 24 within the virtual concentrator cluster 22, but is serviced by the concentrator acting as a master concentrator 24-1 within the virtual concentrator cluster 22.

As shown in FIG. 1, the virtual concentrator cluster 22 includes the master (e.g., active) concentrator 24-1 and a backup concentrator 24-2. The concentrator 24 within the virtual concentration cluster 22 that services the network identification address 46 of the virtual concentrator cluster 22 (e.g., services the VPN connection 32 between the client device 26 and the network 28) acts as the master concentrator within the virtual concentrator cluster 22. Any concentrator 24 within the virtual concentrator cluster 22 can perform as the master concentrator 24-1. The backup concentrator 24-2 within the virtual concentrator cluster 22 assumes the role (e.g., perform the function) of the master concentrator 24-1 in the case where the master concentrator 24-1 becomes inoperable. For example, the backup concentrator 24-2 is configured to maintain the VPN connection 32 between the client device 26 and the network 28 if the master concentrator 24-1 fails.

The client device 26 is a computerized device, such as a laptop or personal computer, configured to establish the tunnel or VPN connection 32 with the private network 28. The VPN connection 32 between the private network 28 and the client device 26, in one arrangement, is a data connection that allows transmission of data over the public network 30 (e.g., Internet) typically through the use of a combination of data encapsulation, data encryption, and user authentication. The use of a VPN connection, therefore, protects or limits the interception of data transmitted between the client device 26 and the private network 28 by an unauthorized user. For example, the VPN connection 32 between the private network 28 and the client device 26 is established through the public network 30 using a VPN tunneling protocol such as the IP Security (IPSec) Protocol, the Layer 2 Tunneling Protocol (L2TP) or the Point-To-Point Tunneling Protocol (PPTP).

Figure 2:
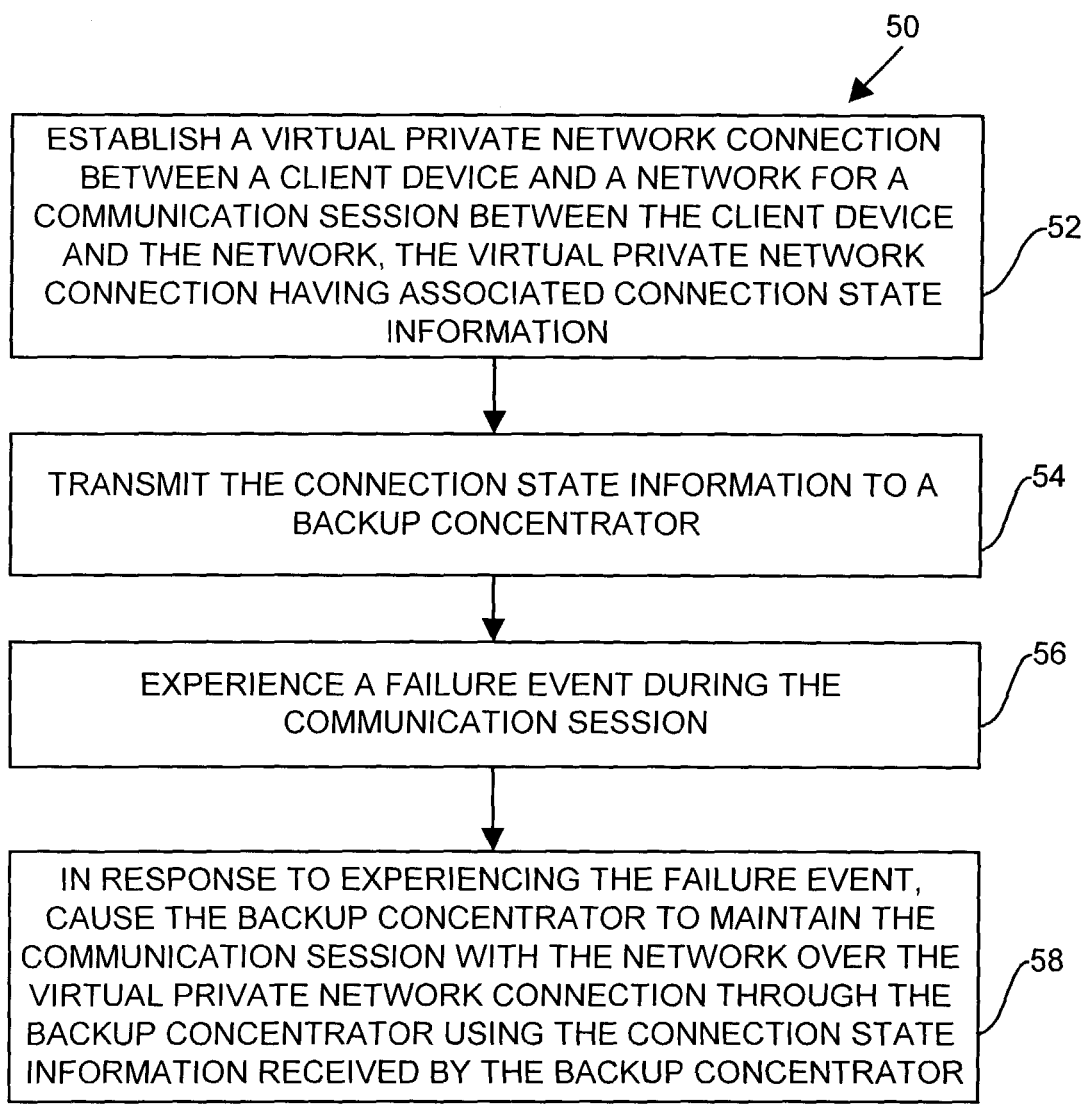
FIG. 2 is a flowchart of a procedure performed by the master concentrator of FIG. 1, configured according to one embodiment of the invention.

FIG. 2 illustrates a flowchart showing a method 50 performed by the master concentrator 24-1 of the data communications system 20, according to one arrangement. In the method 50, the master concentrator 24-1 maintains the virtual private network connection 32 between the client device 26 and the network 28.

In step 52, the master concentrator 24-1 establishes 38 the virtual private network connection 32 between the client device 26 and the network 28 for a communication session between the client device 26 and the network 28, the virtual private network connection 32 having associated connection state information 34.

In one arrangement, the client device 26 initiates the virtual private network connection 32 to the private network 28 by transmitting a request 44 to the virtual concentrator cluster 22. The client device 26 transmits the request 44 to the identification address 46 of the virtual concentrator cluster 22. One concentrator 24 within the virtual concentration cluster 22 services the identification address 46 and acts as the master concentrator 24-1 within the cluster 22. In turn, the master concentrator 24-1 responds to the request 44 to establish the VPN connection 32 between the client device 26 and the private network 28.

In one arrangement, during establishment of the VPN connection 32, the master concentrator 24-1 and the client device 26 negotiate encryption and authentication policies (e.g., encryption and authentication keys) for the VPN connection 32. For example, in one arrangement, the master concentrator 24-1 and the client device 26 perform an Internet Key Exchange (IKE) negotiation prior to establishing the VPN connection 32 between the client device 26 and the network 28. IKE is an Internet Engineering Task Force recommended protocol for secure network communications and is based on a frame work protocol, called Internet Security Association and Key Management Protocol (ISAKMP), that implements the Oakley key exchange. The master concentrator 24-1 maintains the negotiated keys as connection state information 34 for the VPN connection 32. The negotiated keys or state information 34 provide the master concentrator 24-1 with the ability to authenticate data communications between the client device 26 and the private network 28, thereby allowing maintenance of the VPN connection 32.

In step 54, the master concentrator 24-1 transmits 40 the connection state information 34 to a backup concentrator 24-2. In one arrangement, the master concentrator 24-1 transmits the connection state information 34 to the backup concentrator 24-2 via a secured connection, such as an IPSec connection between the master concentrator 24-1 and the backup concentrator 24-2. Such a secured connection minimizes the ability of an unauthorized user to intercept the connection state information 34 for the VPN connection 32.

In step 56, the master concentrator 24-1 experiences a failure event 48 during the communication session. For example, in one arrangement, such a failure event 48 is caused by a power outage of the master concentrator 24-1. The failure event 48, in another example, is caused by the failure of a critical component (e.g., memory, processor, etc.) associated with the master concentrator 24-1. As a result of the failure event 48, the master concentrator 24-1 suspends or ceases operation. In turn, the master concentrator 24-1 ceases maintenance of the VPN connection 32 between the client device 26 and the network 28.

In step 58, in response to experiencing the failure event 48, the master concentrator 24-1 causes the backup concentrator 24-2 to maintain the communication session with the network 28 over the virtual private network connection 32 through the backup concentrator 24-2 using the connection state information 34 received by the backup concentrator 24-2. As described above, the state information 34 includes the negotiated keys (e.g., encryption and authentication keys) for the VPN connection 32 between the client device 26 and the network 28. Because the backup concentrator 24-2 received the negotiated keys 34 (e.g., state information 34) from the master concentrator 24-1, the backup concentrator 24-2 can maintain the VPN connection 32 between the client device 26 and the private network 28 when the master concentrator 24-1 fails.

In one arrangement, the failure of the master concentrator 24-1 triggers the backup concentrator 24-2 to maintain the communication session between the client device 26 and the network 28. In one arrangement, during the communication session between the client device 26 and the network 28, the backup concentrator 24-2 monitors the master concentrator 24-1 for a failure event via a feedback monitoring system. For example, the backup concentrator transmits a signal to the master concentrator 24-1. Reception of a return signal by the backup concentrator 24-2 indicates, to the backup concentrator 24-2, operability of the master concentrator 24-1. Non-reception of a return signal by the backup concentrator 24-2 after a certain time period indicates, to the backup concentrator 24-2, failure of the master concentrator 24-1.

In the case where the backup concentrator 24-2 detects failure of the master concentrator 24-1 (e.g., does not receive a return signal form the master concentrator 24-1), the backup concentrator 24-2 uses the connection state information 34 to maintain the communication session between the client device 26 and the network 28 over the VPN connection 32. In maintaining the communication session, the backup concentrator 24-2 provides a relatively seamless (e.g., undetected by the client device 26) failover of the VPN connection 32 when the master concentrator 24-1 fails. Such a failover occurs without requiring the client device 26 to reestablish the VPN connection 32 with another concentrator within the virtual concentrator cluster 22 (e.g., establish a second or "new" VPN connection with an operational concentrator 24 within the virtual concentrator cluster 22). The failover also occurs without impacting or affecting the data communications session (e.g., active session, such as a File Transfer Protocol session) between the client device 26 and the private network 28.

In one arrangement, prior to transmitting the connection state information 34 to the backup concentrator 24-2, the master concentrator 24-1 selects 42 the backup concentrator 24-2 from a plurality of concentrators 24. For example, the master concentrator transmits a backup selection message 43 to a concentrator 24 to notify the concentrator 24-2 of such a selection. During the selection process, the master concentrator 24-1 selects one of the concentrators 24 within the virtual concentrator cluster 22 to act as the backup concentrator based upon a selection criteria.

In one arrangement, the selection criteria is based upon the relative concentrator load of the concentrators 24 within the virtual concentrator cluster 22. For example, the master concentrator 24-1 detects the amount of traffic (e.g., data) carried by each concentrator 24 within the virtual concentrator cluster 22 and selects a concentrator 24 carrying the least amount of traffic as the backup concentrator 24-2. In one arrangement, the selected concentrator 24 acts as the dedicated backup to the master concentrator 24-1 and does not carry or transmit communications traffic until the master concentrator 24-1 fails.

In one arrangement, the selection criteria is based upon the relative location of a particular concentrator 24 within the virtual concentrator cluster 22. For example, the master concentrator 24-1 selects the backup concentrator 24-2 from the concentrators 24 within the virtual concentrator cluster 22 based upon the concentrator 24-2 being within geographic proximity or geographically "closest" to the master concentrator 24-1. Because the backup concentrator 24-2 is within geographic proximity to the master concentrator 24-1, the failover of the VPN connection 32 to the backup concentrator 24-2 minimizes burdens on the private network 28 with respect to routing data, for the communication session, within the private network 28.

In another arrangement, the selection criteria is based upon the relative performance of a concentrator 24 within the virtual concentration cluster 22. For example, the master concentrator 24-1 detects the data transmission rate of the concentrators 24 within the virtual concentration cluster 22. The master concentrator 24-1 then selects, as the backup concentrator, the concentrator 24 having the highest relative data transmission rate within the virtual concentration cluster 22. Such selection provides a relatively fast delivery of data during the communication session between the client device 26 and the private network 28.

As illustrated in FIG. 1, after failure of the master concentrator 24-1, the backup concentrator 24-2 maintains the communication session between the client device 26 and the network 28 by transmitting a redirect message 36 to the client device 26. As described in detail with respect to FIG. 3, the redirect message 36 instructs the client device 26 to direct communications (e.g., data), carried in the communication session with the network 28, through the backup concentrator 24-2 rather than through the failed master concentrator 24-1.

Figure 3:
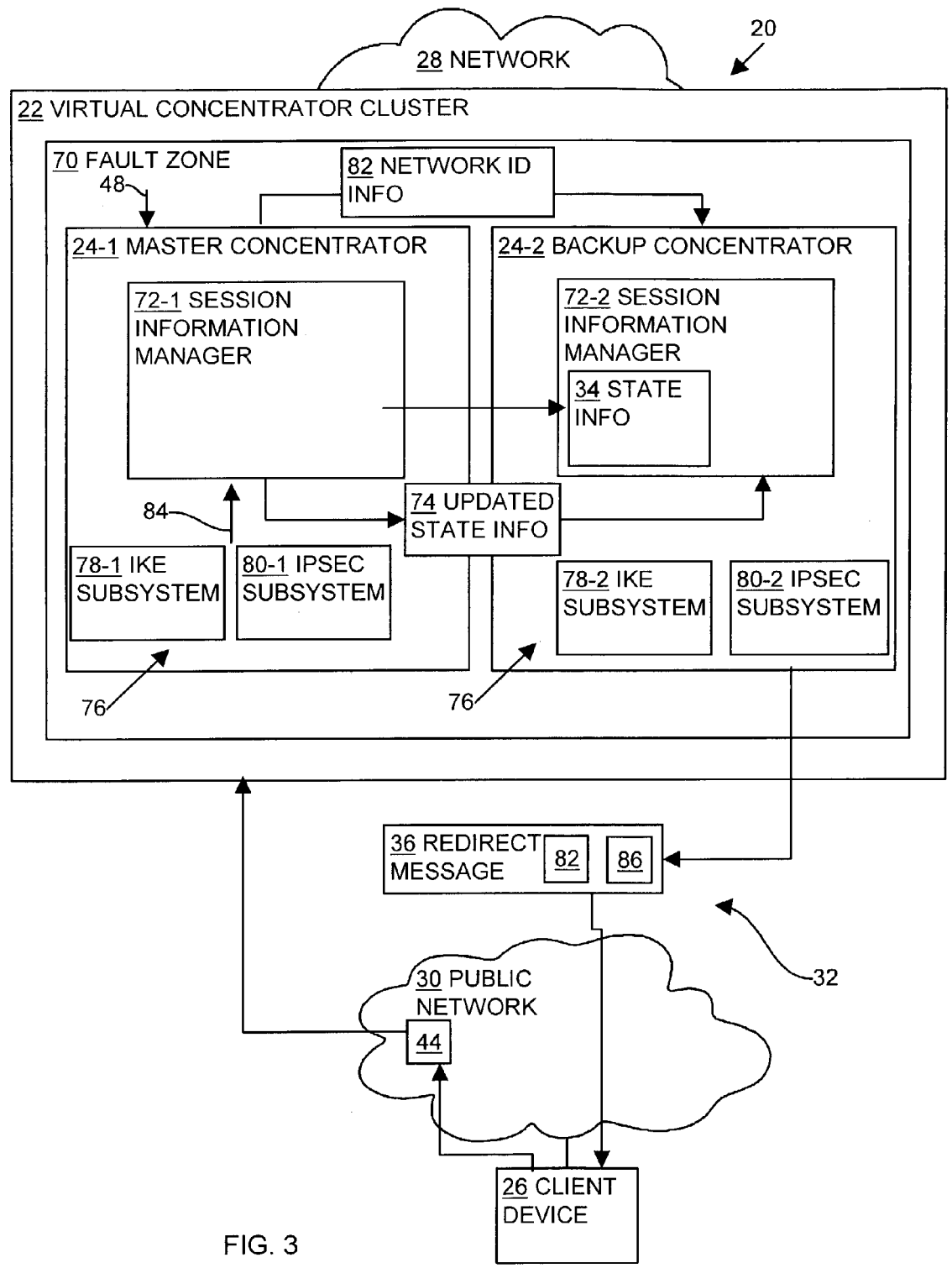
FIG. 3 is a block diagram of the data communication system of FIG. 1, configured according to one embodiment of the invention.

FIG. 3 illustrates an embodiment of the data communication system 20, illustrated in FIG. 1. The data communications system 20 has a virtual concentration cluster 22 that includes concentrators 24-1, 24-2 organized into fault zones 70. Each concentrator 24 within the fault zone 70 has a session information manager 72 and a connection subsystem 76.

The virtual concentration cluster 22, in one arrangement, defines multiple fault zones 70. Each fault zone 70 represents a relationship among concentrators 24 in a virtual concentration cluster 22. All concentrators 24 within a fault zone 70 (e.g., all concentrators assigned to a particular group) service virtual private network connections 32 and provide for failover of the virtual private network connections 32 and the communications sessions (e.g., active session) carried by the virtual private network connections 32 in the event of a failure of a concentrator within the fault zone 70. Because the virtual concentration cluster 22 has concentrators organized into subgroups or fault zones 70, in the event the master concentrator 24-1 fails, such failure affects only a portion of the concentrators 24 within the virtual concentration cluster 22. Failure of one master concentrator 24-1 affects only the concentrators 24 within the master concentrator's fault zone 70 and does not disrupt the operation of other concentrators 24 within other fault zones 70 defined by the virtual concentration cluster 22.

The session information manager 72 of each concentrator 24 is configured to receive and transmit state information 34 related to VPN connections 32, carried by each concentrator 24, between client devices 26 and the private network 28. In one arrangement, the session information manager 72 coordinates state information received from multiple connection subsystems 78

Each connection subsystem 76 within a concentrator 24, in one arrangement, interacts with the client device for particular connection protocols. For example, as shown in FIG. 3, the master concentrator 24-1 and the backup concentrator 24-2 each have an IKE subsystem, 78-1, 78-2, respectively, and an IP Security (IPSec) subsystem 80-1, 80-2, respectively. For example, the connection subsystems 78-1, 80-1 are configured to provide state information 34 to the session information manager 24-1 for particular connection between the client device 26 and the master concentrator 24-1. The IKE subsystem 78-1 provides state information, to the session information manager 72-1, related to the IKE session negotiated between the client device 26 and the master concentrator 24-1. The IPSec subsystem 80-1 provides state information, to the session information manager 72-1, related to the IPSec connection (e.g., VPN connection 32) maintained by the master concentrator 24-1.

During operation of the system 20 shown in FIG. 3, in one arrangement, the client device 26 transmits a request 44 to the virtual concentration cluster 22 to initiate an IKE negotiation with the master concentrator 24-1. In the IKE negotiation, the client device 26 and the master concentrator 24-1, through the IKE subsystem 78-1, negotiate encryption and authentication policies regarding the IKE session.

After conclusion of the IKE negotiation, the master concentrator 24-1 establishes a VPN connection 32, such as an IPSec connection, between the client device 26 and the network 28. The IPSec subsystem 80-1 associated with the master concentrator 24-1 retrieves state information (e.g., IPSec state information) related to the VPN connection 32 (e.g., IPSec connection) between the client device 26 and the network 28.

Each connector subsystem 78-1, 80-1 registers 84 with the session information manager 72-1 after receiving the state information 34 for each, respective connection. For example, during the registration 84, the IKE subsystem transmits IKE state information to the session information manager 72-1 and the IPSec subsystem 80-1 transmits IPSec state information to the session information manager 72-1. The session information manager 72-1, in turn, transmits the received IKE state information and IPSec state information to the backup concentrator 24-2 (e.g., the concentrator 24 selected by the master concentrator 24-1 as the backup concentrator 24-2) as state information 34. As described above, in the case where the master concentrator 24-1 experiences a failure event, the backup concentrator 24-2 utilizes the state information 34 to maintain the VPN connection 32 between the client device 26 and the network 28 with minimal affect on the communication session between the client device 26 and the network 28.

In one arrangement, the session information manager 72-1 of the master concentrator 24-1 updates the state information 34 of the virtual private network connection 32 prior to experiencing the failure event 48. For example, during IKE sessions, the key (e.g., state information) negotiated between the client device 26 and the master concentrator 24-1 expires after a given time period (e.g., after an eight or twenty-four hour period). Such expiration minimizes security risks to the VPN connection 32 by minimizing the time available for an unauthorized user to decrypt the key and gain access to the VPN connection 32. During the IKE session, therefore, the client device 26 and master concentrator 24-1 renegotiate the key. The IKE subsystem 78-1 of the master concentrator 24-1 retrieves the key as IKE state information and transmits 84 the updated information to the session information manager 72-1. The master concentrator 24-1 transmits 84 the state information as updated state information 74 to the backup concentrator 24-2.

In the event the master concentrator 24-1 fails or becomes inoperable, the communication session between the client device 26 and the network 28 transfers (e.g., failsover) to the backup concentrator 24-2. Because the backup concentrator 24-2 receives and stores the updated state information 74, the backup concentrator 24-2, in turn, utilizes the state information 74 to maintain the VPN connection 32 and the communication session between the client device 26 and the network 28. The backup concentrator 24-2 performs such maintenance without breaking the VPN connection 32 and requiring the client device 26 to reestablish the VPN connection 32 with the private network 28.

In one arrangement, the master concentrator 24-1 transmits network identification information 82, associated with the master concentrator 24-1, to the backup concentrator 24-2. For example, the network identification information 82 is the IP address of the master concentrator 24-1. In one arrangement, the IP address of the master concentrator 24-1 is equivalent to the IP address as the identification address 46 of the virtual concentration cluster 22. The backup concentrator 24-2 uses the network identification information 82, as part of the redirect message 34 transmitted to the client device 26, to maintain the VPN connection between the client device 26 and the private network.

For example, assume the backup concentrator 24-2 receives the network identification information 82 from the master concentrator 24-1. Also assume that the backup concentrator 24-2 has previously received state information 34 from the master concentrator 24-1, the state information 34 including IKE key information and state information relating to the VPN (e.g., IPSec) connection 32 between the client device 26 and the network 28.

When the backup concentrator 24-2 detects failure of the master concentrator 24-1, as described above, the backup concentrator 24-2 transmits the redirect message 36 to the client device 26. In one arrangement, the redirect message 36 is an IKE packet (e.g., IKE notify message) containing the network identification information 82, associated with the master concentrator 24-1, located within a "notify" portion of the IKE packet. The backup concentrator 24-2 spoofs the network identification information or IP address 82 of the master concentrator 24-1 to ensure that the client device 26 accepts the redirect message or packet 36. In such a case, the redirect message 36 appears, to the client device 26, as having been transmitted from the master concentrator 24-1.

The redirect message 36 also includes network identification information 86 associated with the backup concentrator 24-2 (e.g., the IP address of the backup concentrator 24-2). The redirect message 36 causes the client device 26 to utilize the network identification information 86 associated with the backup concentrator 24-2 and direct communication session data to the network 28 through the backup concentrator 24-2. Because the backup concentrator 24-2 stores the state information 34 relating to the VPN connection 32, the backup concentrator 24-2 maintains the VPN connection 32 and the communication session carried by the VPN connection 32.

In one arrangement, after the client device redirects the communications session through the backup concentrator 24-2, the backup concentrator 24-2 and the client device 26 perform an IKE negotiation to negotiate encryption and authentication policies regarding the IKE session between the backup concentrator 24-2 and the client device 26.

Figure 4:
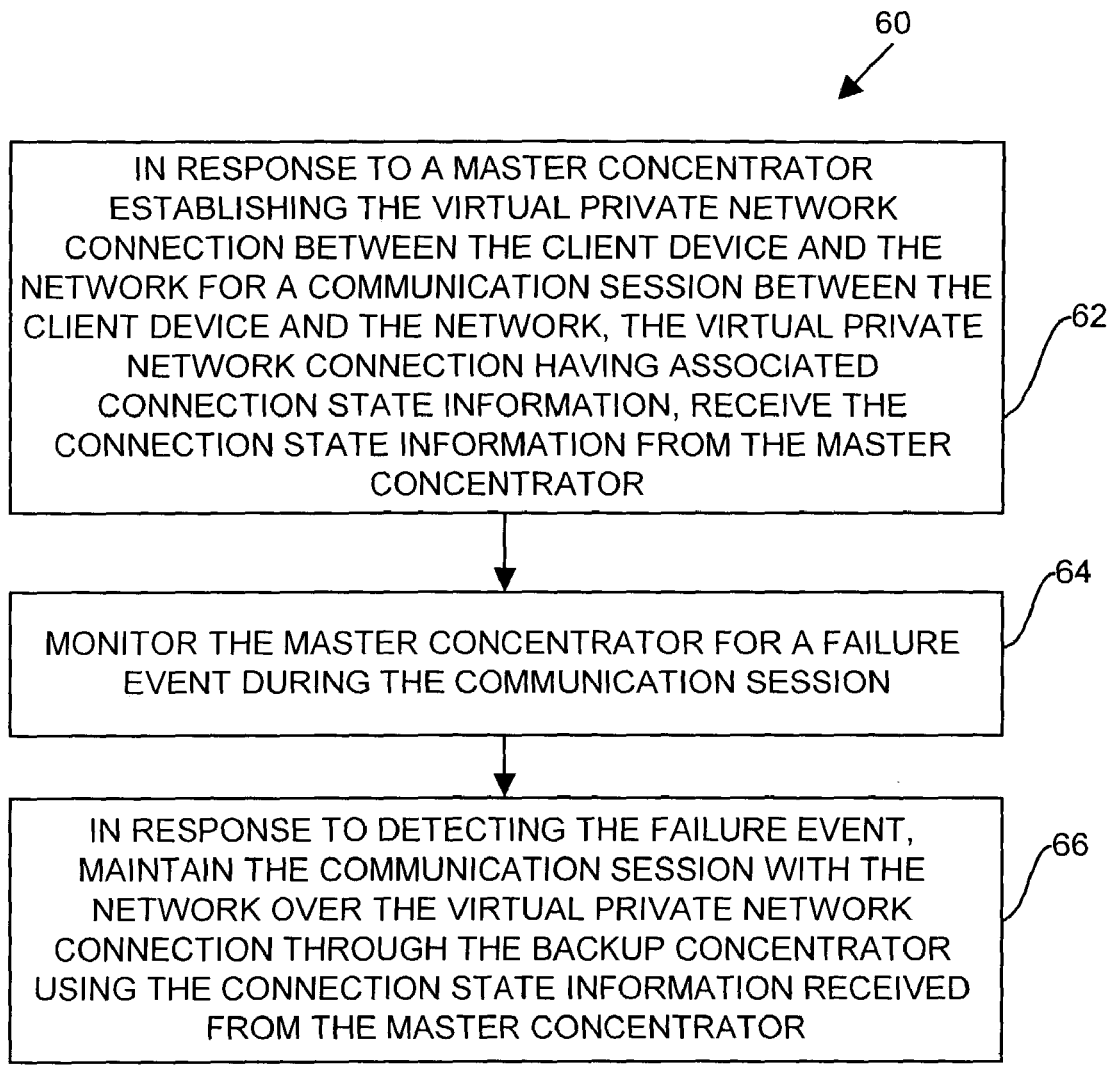
FIG. 4 is a flowchart of a procedure performed by the backup concentrator of FIG. 1, configured according to one embodiment of the invention.

FIG. 4 illustrates a flowchart showing a method 60 performed by the backup concentrator 24-2 of the data communications system 20, according to one arrangement. In the method 60, the backup concentrator 24-2 maintains the virtual private network connection 32 between the client device 26 and the network 28.

In step 62, in response to a master concentrator 24-1 establishing the virtual private network connection 32 between the client device 26 and the network 28 for a communication session between the client device 26 and the network 28 where the virtual private network connection 32 has associated connection state information 34, the backup concentrator 24-2 receives the connection state information 34 from the master concentrator 24-1.

In one arrangement, the backup concentrator 24-2 receives updated state information 74 from the master concentrator 24-1. In the case where the state information relating to the communications session between the client 26 and the network changes (e.g., updating of the IKE key information), by receiving the updated state information, the backup concentrator 24-2 can maintain the communications session between the client device 26 and the network 28 in the event of a failure of the master concentrator 24-1.

In step 64, the backup concentrator 24-2 monitors the master concentrator 24-1 for a failure event during the communication session. In one arrangement, during the communications session between the client device 26 and the private network 28, the backup concentrator 24-2 monitors the master concentrator 24-1 for a failure event via a feedback system (e.g., the backup concentrator 24-2 monitors the "heartbeat" associated with the master concentrator 24-1).

In step 66, in response to detecting the failure event, the backup concentrator 24-2 maintains the communication session with the network 28 over the virtual private network connection 32 through the backup concentrator 24-2 using the connection state information 34 received from the master concentrator. For example, the backup concentrator 24-2 detects the failure event regarding the master concentrator 24-1 by receiving feedback (e.g., a signal) via the feedback system while monitoring the master concentrator 24-1. As described above, the backup concentrator 24-2 transmits a redirect message 36 to the client device 26 to maintain the VPN connection 32 between the client device 26 and the private network 28.

Figure 5:
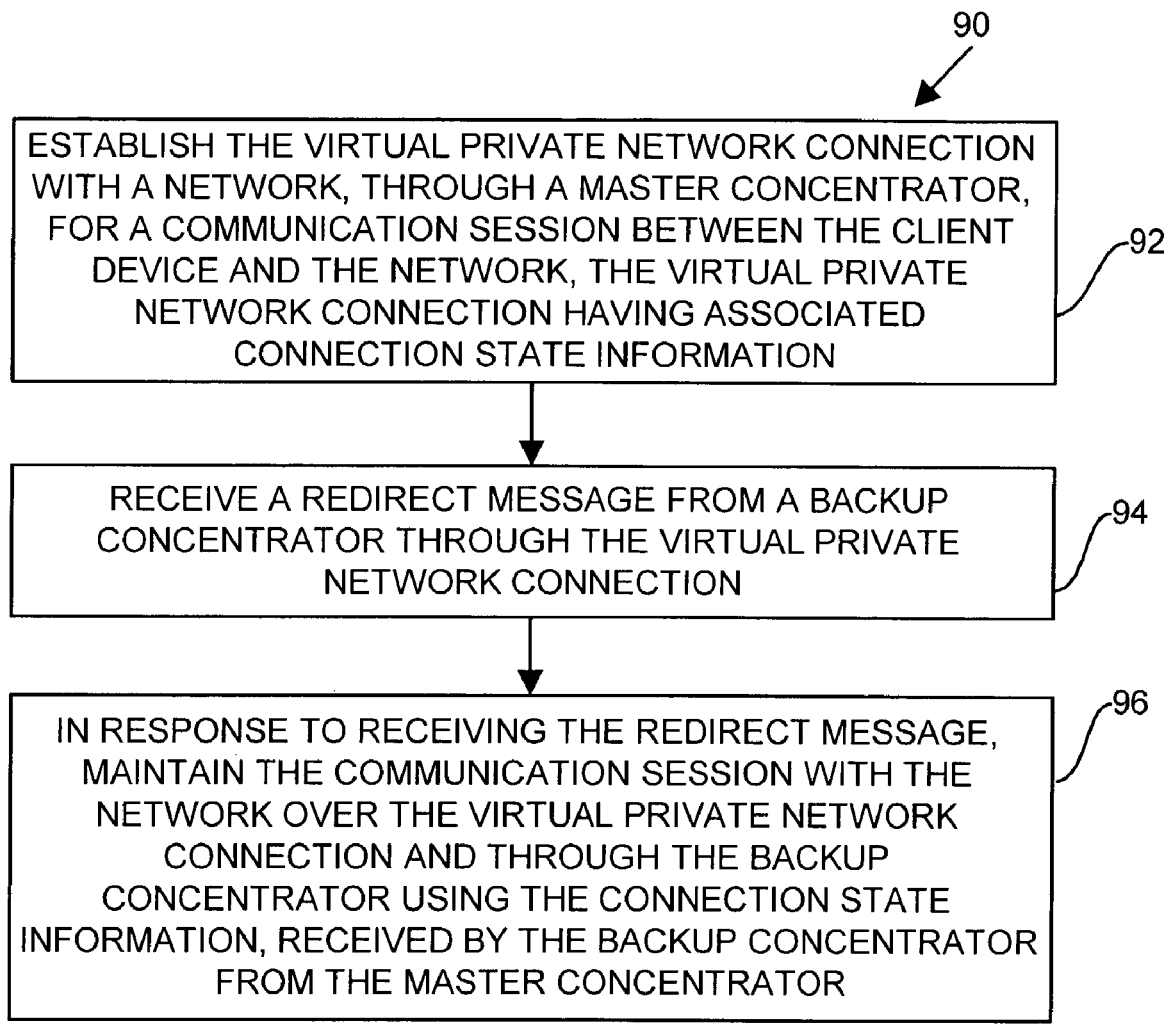
FIG. 5 is a flowchart of a procedure performed by the client device of FIG. 1, configured according to one embodiment of the invention.

FIG. 5 illustrates a flowchart showing a method 90 performed by the client device 26 of the data communications system 20, according to one arrangement. In the method 60, the client device 26 maintains the virtual private network connection 32 with the network 28 when the master concentrator 24-1 experiences a failure event 48.

In step 92, the client device 26 establishes the virtual private network connection 32 with a network 28, through the master concentrator 24-1, for a communication session between the client device 26 and the network, 28 where the virtual private network connection has associated connection state information 31.

In step 94, the client device 26 receives a redirect message 36 from a backup concentrator 24-2 through the virtual private network connection 32.

In step 96, in response to receiving the redirect message 36, the client device 26 maintains the communication session with the network 28 over the virtual private network connection 32 and through the backup concentrator 24-2 using the connection state information 34 received by the backup concentrator 24-2 from the master concentrator 24-1.

Figure 6:
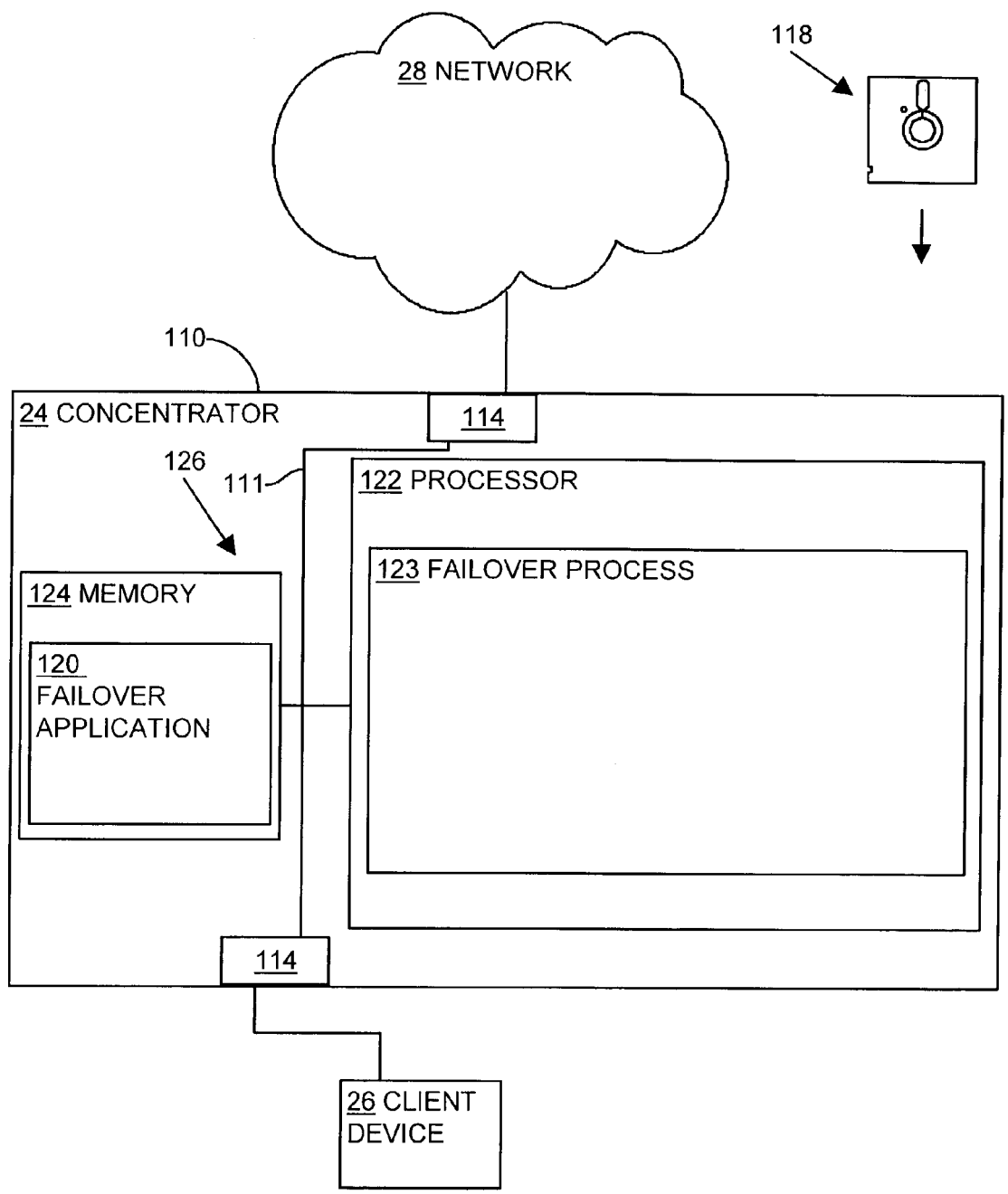
FIG. 6 is a block diagram of a computerized device, configured according to one embodiment of the invention.

FIG. 6 illustrates a more detailed architecture of a computerized device 110 configured as a concentrator 24 according to one embodiment of the invention. A computer program product 118 includes an application or logic instructions, such as failover instructions, that are loaded into the computerized device 110 to configure the computerized device 110 to transfer or failover communications sessions with the client device 26 to a second computerized device (e.g., a backup concentrator) in the event of a failure of the computerized device 110.

The computerized device 110 in this embodiment of the invention includes an interconnection mechanism 111 such as a data bus and/or other circuitry that interconnects a controller 124, including a memory 124 and a processor 122, and one or more communications interfaces 114.

The memory 124 can be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 124 is encoded with logic instructions (e.g., software code) and/or data that form a failover application 120 configured according to embodiments of the invention. In other words, the failover application 120 represents software code, instructions and/or data that represent or convey the processing logic steps and operations as explained herein and that reside within memory or storage or within any computer readable medium accessible to the computerized device 110.

The processor 122 represents any type of circuitry or processing device such as a central processing unit, microprocessor or application-specific integrated circuit that can access the failover application 120 encoded within the memory 124 over the interconnection mechanism 111 in order to execute, run, interpret, operate or otherwise perform the failover application 120 logic instructions. Doing so forms the failover process 123. In other words, the failover process 123 represents one or more portions of the logic instructions of the failover application 120 while being executed or otherwise performed on, by, or in the processor 122 within the computerized device 110.

Those skilled in the art will understand that there can be many variations made to the embodiments explained above while still achieving the same objective of those embodiments and the invention in general.

As described above, the backup concentrator 24-2 acts as a backup to the master concentrator 24-1 and is not an active concentrator within the system 20 (e.g., the backup concentrator 28-2 does not carry communications between the network 28 and client devices 26 within the system 20 during operation of the master concentrator 24-1). In such a case, all of the ports associated with the backup concentrator 24-2 are available to carry the data communications between the client device 26 and the private network 28 in the case where the master concentrator 24-1 experiences a failure.

In another arrangement, the backup concentrator 24-2 is a working (e.g., active) concentrator that carries communication sessions between the network 28 and additional client devices 26-N while monitoring the master concentrator 24-1 for a failure event. In such an arrangement, prior to detecting a failure event in the master concentrator 24-1, the backup concentrator 24-1 assigns a first portion of multiple ports associated with the backup concentrator 24-2 as working connection ports. Such ports allow the backup concentrator 24-2 to carry data communications between client devices 26-N and the network 28. The backup concentrator 24-2 also assigns a second portion of multiple ports associated with the backup concentrator 24-2 as backup ports. The backup ports are ports dedicated to carry data communications a client device 26 and the private network 28 in the event the master concentrator 24-1 fails (e.g., the backup ports carry the "failed over" communications session initially carried by the master concentrator). In one arrangement the backup concentrator 24-2 is configured with a resource manager that divides the ports associated with the backup concentrator 24-2 into a working connection ports or backup connection ports.

Such variations are intended to be covered by the scope of this invention. As such, the foregoing description of embodiments of the invention is not intended to be limiting. Rather, any limitations to the invention are presented in the following claims.

What is claimed is:

1. In a master concentrator, a method for maintaining a virtual private network connection between a client device and a network, comprising the steps of:
    establishing the virtual private network connection between the client device and the network for a communication session between the client device and the network, the virtual private network connection having associated connection state information;
    transmitting the connection state information to a backup concentrator;
    transmitting network identification information, associated with the master concentrator, to the backup concentrator;
    experiencing a failure event during the communication session; and
    in response to experiencing the failure event, causing the backup concentrator to:
        maintain the communication session with the network over the virtual private network connection through the backup concentrator using the connection state information received by the backup concentrator; and
        transmit a redirect message to the client device, the redirect message appearing, to the client device, to have the network identification information associated with the master concentrator and directing the client to maintain the virtual private network connection with the backup concentrator.

2. The method of claim 1 further comprising a step of selecting the backup concentrator from a plurality of concentrators.

3. The method of claim 2 wherein the step of selecting comprises the step of selecting based upon a criteria of the plurality of concentrators, the criteria chosen from the group consisting of concentrator load, concentrator location, or concentrator performance.

4. The method of claim 1 further comprising a step of updating the state information of the virtual private network connection prior to experiencing the failure event.

5. The method of claim 1 wherein the step of causing comprises the step of causing the backup concentrator to transmit the redirect message to the client device using an Internet Key Exchange notify message.

6. A master concentrator comprising:
    at least one communications interface;
    a controller; and
    an interconnection mechanism coupling the at least one communications interface and the controller;
    wherein the controller is configured to:
        establish the virtual private network connection between the client device and the network for a communication session between the client device and the network, the virtual private network connection having associated connection state information;
        transmit the connection state information to a backup concentrator;
        transmit network identification information, associated with the master concentrator, to the backup concentrator; and
        in response to experiencing a failure event during the communications session, cause the backup concentrator to:
            maintain the communication session with the network over the virtual private network connection through the backup concentrator using the connection state information received by the backup concentrator; and
            transmit a redirect message to the client device, the redirect message appearing, to the client device, to have the network identification information associated with the master concentrator and directing the client to maintain the virtual private network connection with the backup concentrator.

7. The master concentrator of claim 6 wherein the controller is further configured to select the backup concentrator from a plurality of concentrators.

8. The master concentrator of claim 7 wherein the controller is further configured to, when selecting, select based upon a criteria of the plurality of concentrators, the criteria chosen from the group consisting of concentrator load, concentrator location, or concentrator performance.

9. The master concentrator of claim 6 wherein the controller is further configured to update the state information of the virtual private network connection prior to experiencing the failure event.

10. The master concentrator of claim 6 wherein the controller, when causing, causes the backup concentrator to transmit the redirect message to the client device using an Internet Key Exchange notify message.

11. A computer program product having a computer-readable medium including computer program logic encoded thereon that, when performed on a controller in a master concentrator having a coupling to at least one communications interface provides a method for performing the operations of:
 establishing a virtual private network connection between a client device and a network for a communication session between the client device and the network, the virtual private network connection having associated connection state information;
 transmitting the connection state information to a backup concentrator;
 transmitting network identification information, associated with the master concentrator, to the backup concentrator; and
 in response to experiencing a failure event, causing the backup concentrator to:
  maintain the communication session with the network over the virtual private network connection through the backup concentrator using the connection state information received by the backup concentrator; and
  transmit a redirect message to the client device, the redirect message appearing, to the client device, to have the network identification information associated with the master concentrator and directing the client to maintain the virtual private network connection with the backup concentrator.

12. A master concentrator comprising:
 at least one communications interface;
 a controller; and
 an interconnection mechanism coupling the at least one communications interface and the controller;
 wherein the controller is configured to produce a means for maintaining a virtual private network connection between a client device and a network, such means including:
  means for establishing the virtual private network connection between the client device and the network for a communication session between the client device and the network, the virtual private network connection having associated connection state information;
  means for transmitting the connection state information to a backup concentrator;
  means for transmitting network identification information, associated with the master concentrator, to the backup concentrator; and
  in response to experiencing the failure event, means for causing the backup concentrator to:
   maintain the communication session with the network over the virtual private network connection through the backup concentrator using the connection state information received by the backup concentrator; and
   transmit a redirect message to the client device, the redirect message appearing, to the client device, to have the network identification information associated with the master concentrator and directing the client to maintain the virtual private network connection with the backup concentrator.

13. In a backup concentrator, a method for maintaining a virtual private network connection between a client device and a network, comprising the steps of:
 in response to a master concentrator establishing the virtual private network connection between the client device and the network for a communication session between the client device and the network, the virtual private network connection having associated connection state information, receiving the connection state information from the master concentrator;
 receiving, from the master concentrator, network identification information associated with the master concentrator;
 monitoring the master concentrator for a failure event during the communication session; and
 in response to detecting the failure event:
  maintaining the communication session with the network over the virtual private network connection through the backup concentrator using the connection state information received from the master concentrator; and
  transmitting a redirect message to the client device, the redirect message appearing, to the client device, to have the network identification information associated with the master concentrator and directing the client to maintain the virtual private network connection with the backup concentrator.

14. The method of claim 13 further comprising the step of receiving, from the master concentrator, a backup selection message, the backup selection message selecting the backup concentrator from a plurality of concentrators.

15. The method of claim 13 further comprising the step of receiving updated connection state information, associated with the virtual private network connection, prior to detecting the failure event.

16. The method of claim 13 wherein the step of transmitting comprises the step of transmitting the redirect message to the client device using an Internet Key Exchange notify message.

17. A backup concentrator comprising:
 at least one communications interface;
 a controller; and
 an interconnection mechanism coupling the at least one communications interface and the controller;
 wherein the controller is configured to:
  in response to a master concentrator establishing the virtual private network connection between the client device and the network for a communication session between the client device and the network, the virtual private network connection having associated connection state information, receive the connection state information from the master concentrator;
  receive, from the master concentrator, network identification information associated with the master concentrator;
  monitor the master concentrator for a failure event during the communication session; and
  in response to detecting the failure event:

maintain the communication session with the network over the virtual private network connection through the backup concentrator using the connection state information received from the master concentrator; and transmit a redirect message to the client device, the redirect message appearing, to the client device, to have the network identification information associated with the master concentrator and directing the client to maintain the virtual private network connection with the backup concentrator.

18. The backup concentrator of claim 17 wherein the controller is further configured to receive, from the master concentrator, a backup selection message, the backup selection message selecting the backup concentrator from a plurality of concentrators.

19. The backup concentrator of claim 17 wherein the controller is further configured to receive updated connection state information, associated with the virtual private network connection, prior to detecting the failure event.

20. The backup concentrator of claim 17 wherein the controller is further configured to, when transmitting, transmit the redirect message to the client device using an Internet Key Exchange (IKE) notify message.

21. A computer program product having a computer-readable medium including computer program logic encoded thereon that, when performed on a controller in a backup concentrator having a coupling to at least one communications interface provides a method for performing the operations of:

in response to a master concentrator establishing a virtual private network connection between a client device and a network for a communication session between the client device and the network, the virtual private network connection having associated connection state information, receiving the connection state information from the master concentrator;

receiving, from the master concentrator, network identification information associated with the master concentrator;

monitoring the master concentrator for a failure event during the communication session; and in response to detecting the failure event:
maintaining the communication session with the network over the virtual private network connection through the backup concentrator using the connection state information received from the master concentrator; and transmitting a redirect message to the client device, the redirect message appearing, to the client device, to have the network identification information associated with the master concentrator and directing the client to maintain the virtual private network connection with the backup concentrator.

22. A backup concentrator comprising:
at least one communications interface;
a controller; and
an interconnection mechanism coupling the at least one communications interface and the controller;
wherein the controller is configured to produce a means for maintaining a virtual private network connection between a client device and a network, such means including:
in response to a master concentrator establishing the virtual private network connection between the client device and the network for a communication session between the client device and the network, the virtual private network connection having associated connection state information, means for receiving the connection state information from the master concentrator;

means for receiving, from the master concentrator, network identification information associated with the master concentrator;

means for monitoring the backup concentrator for a failure event during the communication session;

means for maintaining the communication session with the network over the virtual private network connection through the backup concentrator, in response to detecting the failure event, using the connection state information received from the master concentrator; and means for transmitting a redirect message to the client device, in response to detecting the failure event, the redirect message appearing, to the client device, to have the network identification information associated with the master concentrator and directing the client to maintain the virtual private network connection with the backup concentrator.

23. In a client device, a method for maintaining a virtual private network connection with a network, comprising the steps of:

establishing the virtual private network connection with a network, through a master concentrator, for a communication session between the client device and the network, the virtual private network connection having associated connection state information;

receiving a redirect message from a backup concentrator through the virtual private network connection; and in response to receiving the redirect message, maintaining the communication session with the network over the virtual private network connection and through the backup concentrator using the connection state information, received by the backup concentrator from the master concentrator.

24. The method of claim 23 wherein the step of receiving comprises the step of receiving the redirect message as an Internet Key Exchange notify message from the backup concentrator.

25. A client device comprising:
at least one communications interface;
a controller; and
an interconnection mechanism coupling the at least one communications interface and the controller;
wherein the controller is configured to:
establish the virtual private network connection with a network, through a master concentrator, for a communication session between the client device and the network, the virtual private network connection having associated connection state information; receive a redirect message from a backup concentrator through the virtual private network connection; and in response to receiving the redirect message, maintain the communication session with the network over the virtual private network connection and through the backup concentrator using the connection state information, received by the backup concentrator from the master concentrator.

26. A computer program product having a computer-readable medium including computer program logic encoded thereon that, when performed on a controller in a client device having a coupling to at least one communications interface provides a method for performing the operations of:

establishing a virtual private network connection with a network, through a master concentrator, for a communication session between a client device and the network, the virtual private network connection having associated connection state information;

receiving a redirect message from a backup concentrator through the virtual private network connection; and in response to receiving the redirect message, maintaining the communication session with the network over the virtual private network connection and through the backup concentrator using the connection state information, received by the backup concentrator from the master concentrator.

27. A client device comprising:

at least one communications interface;

a controller; and an interconnection mechanism coupling the at least one communications interface and the controller;

wherein the controller is configured to produce a means for maintaining a virtual private network connection with a network, such means including:

means for establishing a virtual private network connection with a network, through a master concentrator, for a communication session between a client device and the network, the virtual private network connection having associated connection state information;

means for receiving a redirect message from a backup concentrator through the virtual private network connection; and means for maintaining the communication session with the network over the virtual private network connection and through the backup concentrator, in response to receiving the redirect message, using the connection state information, received by the backup concentrator from the master concentrator.

* * * * *